(12) United States Patent
Ishii

(10) Patent No.: US 11,873,031 B2
(45) Date of Patent: Jan. 16, 2024

(54) RACK AND PINION STEERING GEAR UNIT

(71) Applicant: NSK LTD., Tokyo (JP)

(72) Inventor: Tatsuya Ishii, Maebashi (JP)

(73) Assignee: NSK LTD., Tokyo (JP)

( * ) Notice: Subject to any disclaimer, the term of this patent is extended or adjusted under 35 U.S.C. 154(b) by 449 days.

(21) Appl. No.: 17/267,582

(22) PCT Filed: Aug. 1, 2019

(86) PCT No.: PCT/JP2019/030229
§ 371 (c)(1),
(2) Date: Feb. 10, 2021

(87) PCT Pub. No.: WO2020/039880
PCT Pub. Date: Feb. 27, 2020

(65) Prior Publication Data
US 2021/0309283 A1  Oct. 7, 2021

(30) Foreign Application Priority Data
Aug. 20, 2018  (JP) ................. 2018-153787

(51) Int. Cl.
*B62D 3/12* (2006.01)
*F16C 29/02* (2006.01)
(Continued)

(52) U.S. Cl.
CPC ............ *B62D 3/12* (2013.01); *F16C 29/02* (2013.01); *F16H 19/04* (2013.01); *F16H 57/02* (2013.01); *F16H 2019/046* (2013.01)

(58) Field of Classification Search
CPC .......... B62D 3/12; F16C 29/002; F16C 29/02; F16C 2361/61; F16C 33/08; F16H 19/04; F16H 57/02; F16H 2019/046; F16H 55/26
See application file for complete search history.

(56) References Cited

U.S. PATENT DOCUMENTS 5,709,283 A * 1/1998 Nief .................. F16J 15/56
180/428
6,330,929 B1 * 12/2001 Gierc .................. B62D 5/22
180/428
(Continued)

FOREIGN PATENT DOCUMENTS

CN  103732476 B  4/2016
JP  2005-014685 A  1/2005
(Continued)

OTHER PUBLICATIONS

International Search Report for PCT/JP2019/030229 dated Sep. 17, 2019.
(Continued)

*Primary Examiner* — Laura Freedman
(74) *Attorney, Agent, or Firm* — Sughrue Mion, PLLC

(57) ABSTRACT

The rack housing has an engaging concave section having a bottom surface configured by a bottom inclined surface that is inclined in a direction outward in the radial direction toward the opening side of the rack housing, and the rack bush comprises an engaging convex section having a top surface configured by a top inclined surface that is inclined in a direction outward in the radial direction toward the opening side of the rack housing. The top inclined surface is pressed against the bottom inclined surface toward outside in the radial direction, and the outside surface of the engaging convex section facing the opening side of the rack housing is pressed against the inner side surface of the engaging concave section facing the inner side of the rack housing.

11 Claims, 11 Drawing Sheets

(51) Int. Cl.
    *F16H 19/04*     (2006.01)
    *F16H 57/02*     (2012.01)

(56) References Cited

U.S. PATENT DOCUMENTS

| | | | | |
|---|---|---|---|---|
| 6,412,591 | B1 * | 7/2002 | Endo | B62D 5/0466 |
| | | | | 180/428 |
| 7,220,056 | B2 * | 5/2007 | Kubota | F16C 33/20 |
| | | | | 384/220 |
| 7,665,747 | B2 * | 2/2010 | Arlt | F16C 33/20 |
| | | | | 384/296 |
| 9,656,685 | B2 | 5/2017 | Iwakawa | |
| 9,933,014 | B2 * | 4/2018 | Ikeda | B62D 3/12 |
| 9,995,337 | B2 * | 6/2018 | Ikeda | F16C 35/02 |
| 10,689,023 | B2 * | 6/2020 | Span | B62D 3/12 |
| 11,465,667 | B2 * | 10/2022 | Ishii | F16C 29/02 |
| 2006/0266140 | A1 * | 11/2006 | Harer | B62D 5/22 |
| | | | | 74/89.12 |
| 2007/0296172 | A1 * | 12/2007 | Gunther | F16C 29/02 |
| | | | | 280/93.514 |
| 2013/0036845 | A1 | 2/2013 | Amada et al. | |
| 2015/0274193 | A1 | 10/2015 | Saito et al. | |

FOREIGN PATENT DOCUMENTS

| | | | |
|---|---|---|---|
| JP | 2007009962 A * | 1/2007 | ............ F16C 29/002 |
| JP | 2009-202742 A | 9/2009 | |
| JP | 2012-254780 A | 12/2012 | |
| JP | 2015-6850 A | 1/2015 | |
| JP | 2015-189378 A | 11/2015 | |
| JP | 2017136905 A * | 8/2017 | |
| JP | 2018-079724 A | 5/2018 | |
| KR | 20100135135 A * | 12/2010 | |

OTHER PUBLICATIONS

Office Action dated Jun. 22, 2022 from the China National Intellectual Property Administration in CN Application No. 201980054528.8.

* cited by examiner

RACK AND PINION STEERING GEAR UNIT

CROSS-REFERENCE TO RELATED APPLICATIONS

This application is a National Stage of International Application No. PCT/JP2019/030229 filed Aug. 1, 2019, which claims priority of Japanese Patent Application No. JP2018-153787 filed on Aug. 20, 2018.

TECHNICAL FIELD

The present invention relates to a rack and pinion steering gear unit of a steering apparatus for applying a steering angle to steered wheels of an automobile.

BACKGROUND ART

A steering apparatus that comprises a rack and pinion steering gear unit is widely used in a steering apparatus for an automobile because it can be configured to be compact and lightweight, has high rigidity, and provides a good steering feeling. The rotary motion of the steering wheel operated by the operator is converted into a reciprocating linear motion and a steering angle is given to the steered wheels via tie rods.

The rack and pinion steering gear unit comprises a pinion shaft to which the rotary motion of the steering wheel is transmitted, a rack shaft that converts the rotary motion of the pinion shaft into a linear motion, and a housing that houses the pinion shaft and the rack shaft. The pinion teeth of the pinion shaft and the rack teeth of the rack shaft are engaged, and the rotary motion of the pinion shaft is convereted into a linear motion of the rack shaft, and the tie rods connected to both sides in the axial direction of the rack shaft are pushed or pulled.

In order to efficiently transmit the rotary motion of the steering wheel to the steered wheels, it is important to support the rack shaft inside the rack housing of the housing so as to be able to smoothly displace in the axial direction. Therefore, a rack bush is arranged inside the rack housing, and the rack shaft is slidably supported by the rack bush. FIG. 11 illustrates a conventional construction described in JP2015-189378A in which a rack shaft is supported inside a rack housing by a rack bush.

In this structure, a rack bush (sliding bearing) 1 made of synthetic resin is used. The rack bush 1 has a tubular body 2 having a generally cylindrical shape and an engaging convex section 3 protruding outward in the radial direction from the outer peripheral surface of the tubular body 2. The rack bush 1 is arranged inside the rack housing 4 via a metallic end case 5 fitted inside the opening of the rack housing 4.

The tubular body 2 of the rack bush 1 is fitted inside a small-diameter hole section 6 provided on the inner peripheral surface of the end case 5, and the engaging convex section 3 of the rack bush 1 is arranged inside the large-diameter hole section 7 provided on the inner peripheral surface of the end case 5. A metal stopper 8 is fitted inside the large-diameter hole section 7 of the end case 5. The engaging convex section 3 is held in the axial direction between a side surface in the axial direction of the stopper 8 and a stepped surface 9 which exists at a portion between the small-diameter hole section 6 and the large-diameter hole section 7 of the inner peripheral surface of the end case 5.

The outer peripheral surface of the rack shaft 10 is slidably supported by the inner peripheral surface of the tubular body 2 of the rack bush 1. Due to this, the rack shaft 10 can be smoothly displaced in the axial direction, and the rotary motion of the steering wheel is efficiently transmitted to the steered wheels. Since the engaging convex section 3 of the rack bush 1 is held in the axial direction between the side surface in the axial direction of the stopper 8 and the stepped surface 9 of the end case 5, the rack bush 1 is suppressed from moving in the axial direction with respect to the end case 5 when the rack shaft 10 slides. Accordingly, occurrence of noise caused by the collision between the rack bush 1 and the end case 5 or the stopper 8 is prevented.

CITATION LIST

Patent Literature

[Patent Literature 1] JP2015-189378A

SUMMARY OF INVENTION

Technical Problem

In the structure described in JP2015-189378A, when the steering wheel is steered to the steering limit, that is, when the steering wheel is in so-called end contact, an end member (not shown) attached to both sides in the axial direction of the rack shaft 10 collides with the end case 5, and a large axial load may be input to the end case 5. In this case, the posture of the rack bush 1 may become unstable.

Taking the situation described above into consideration, the objective of the present invention is to achieve a structure of a rack and pinion steering gear unit that is capable of always stabilizing the posture of the rack bush which slidably supports the rack shaft with respect to the rack housing without any looseness in the axial direction even when the rack bush is not held in the axial direction between two members as in the conventional construction.

Solution to Problem

The rack and pinion steering gear unit of the present invention comprises a housing, a rack bush, a rack shaft, and a pinion shaft.

The housing has a rack housing having a tubular shape with both sides open in the axial direction and including an engaging concave section on an inner peripheral surface thereof, and a pinion housing.

The rack bush has a tubular body and an engaging convex section which protrudes outward in the radial direction from an outer peripheral surface of the tubular body and arranged inside the engaging concave section, and is fitted inside the rack housing.

The rack shaft has rack teeth, and is supported by the inner peripheral surface of the rack bush slidably in the axial direction, and is arranged inside the rack housing.

The pinion shaft has pinion teeth that mesh with the rack teeth on an outer peripheral surface thereof, and is rotatably supported inside the pinion housing.

The engaging convex section is provided on a portion of the rack bush that is located on an opening side of the rack housing.

The engaging concave section comprises a bottom surface (inner peripheral surface), and the bottom surface is inclined outward in the radial direction toward one side in the axial direction of the rack housing.

The engaging convex section comprises a top surface, in a state where the top surface is pressed radially outward with respect to the bottom surface of the engaging concave section, the first surface of the rack bush facing the one side in the axial direction of the rack housing is pressed in the axial direction against the second surface of the inner peripheral surface of the rack housing facing the other side in the axial direction of the rack housing.

The one side in the axial direction of the rack housing may be the opening side of the rack housing, and the other side in the axial direction of the rack housing may be the inner side of the rack housing.

Alternatively, the one side in the axial direction of the rack housing may be the inner side of the rack housing, and the other side in the axial direction of the rack housing may be the opening side of the rack housing.

The engaging convex section comprises a pair of outside surfaces in the axial direction, and the first surface is configured by an outside surface in the axial direction located on the one side in the axial direction of the rack housing among the pair of outside surfaces in the axial direction of the engaging convex section. The engaging concave section comprises a pair of inside surfaces in the axial direction, and the second surface may be configured by an inside surface in the axial direction located on the one side in the axial direction of the rack housing among the pair of inside surfaces in the axial direction of the engaging concave section.

The pair of outside surfaces in the axial direction of the engaging convex section can be configured by flat planes that are parallel to each other and orthogonal to the center axis of the rack bush.

Alternatively or additionally, the pair of inside surfaces in the axial direction of the engaging concave section can be configured by flat planes that are parallel to each other and orthogonal to the center axis of the rack housing.

The top surface of the engaging convex section can be inclined in a direction outward in the radial direction toward the one side in the axial direction of the rack housing. That is, the inclination direction of the top surface of the engaging convex section can be the same as the inclination direction of the bottom surface of the engaging concave section.

In this case, the inclination angle of the bottom surface of the engaging concave section with respect to the center axis of the rack housing and the inclination angle of the top surface of the engaging convex section with respect to the center axis of the rack bush can be the same.

Alternatively, the inclination angle of the bottom surface of the engaging concave section with respect to the center axis of the rack housing can be made larger than the inclination angle of the top surface of the engaging convex section with respect to the center axis of the rack bush.

The cross-sectional shape (bus line shape) of the bottom surface of the engaging concave section can be linear, and the cross-sectional shape of the top surface of the engaging convex section can be linear as well.

The rack bush can be arranged in a portion of the rack housing in the vicinity of an opening section on the side far from the area of engagement between the rack teeth and the pinion teeth in the axial direction.

Alternatively, the rack bush can be respectively arranged in the vicinities of the opening sections on both sides in the axial direction of the rack housing.

A pressing mechanism that presses a pressed section of the outer peripheral surface of the rack shaft located on the side radially opposite to the portion provided with the rack teeth toward the pinion shaft can be further provided.

In this case, the pressing mechanism can comprise a pivot shaft that is supported movably away from and near to the rack shaft, a pressing roller that is rotatably supported around the pivot shaft with its outer peripheral surface being in contact with the pressed section, and an elastic member that presses the pivot shaft toward the pinion shaft.

Alternatively, the pressing mechanism can comprise a rack guide that is arranged movably away from and near to the rack shaft with its tip end portion being in sliding contact with the pressed section and an elastic member that presses the rack guide toward the pinion shaft.

In either case, the pressing mechanism can be housed inside a cylinder portion of the housing.

Advantageous Effects of Invention

With the rack and pinion steering gear unit of the present invention, the rack bush for slidably supporting the rack shaft can be supported with respect to the rack housing without any looseness in the axial direction even when without holding the rack bush between two members in the axial direction.

DESCRIPTION OF EMBODIMENTS

First Example

FIG. 1 to FIG. 7 illustrate a first example of an embodiment of the present invention. Note that, in the following explanation, the forward-backward direction is the forward-backward direction of a vehicle body, the up-down direction is the up-down direction of the vehicle body, and the left-right direction is the width direction of the vehicle body.

Figure 1:
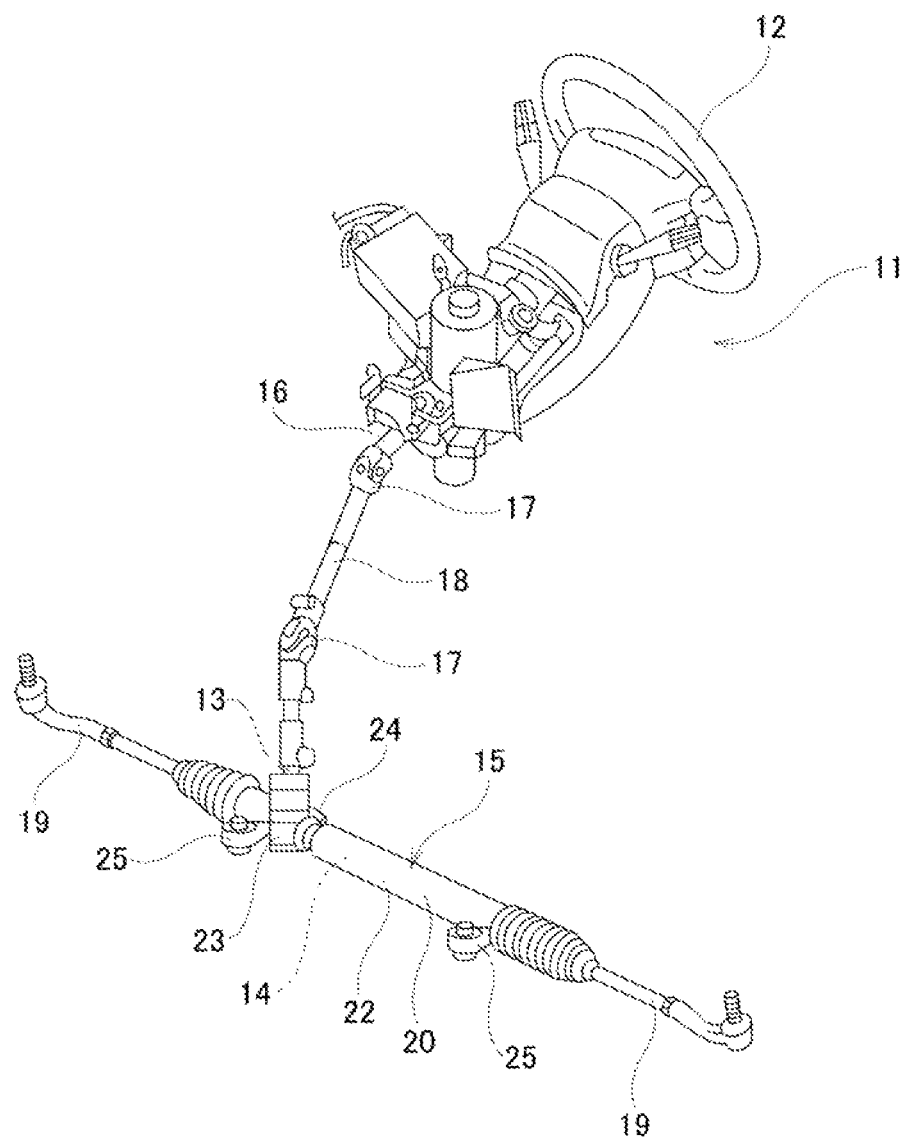
FIG. 1 is a perspective view illustrating a steering apparatus comprising a rack and pinion steering gear unit of a first example of an embodiment of the present invention.

As illustrated in FIG. 1, the steering apparatus 11 converts the rotary motion of the steering wheel 12 operated by the operator into a reciprocating linear motion by a rack and pinion steering gear unit 15 having a pinion shaft 13 and a rack shaft 14, and applies a desired steering angle to the left and right steered wheels (not shown). The steering wheel 12 is fixed to the rear end section of the steering shaft 16. The front end section of the steering shaft 16 is connected to the base end section of the pinion shaft 13 via a pair of universal joints 17 and an intermediate shaft 18. A pair of tie rods 19 connected to the left and right steered wheels are connected to both end sections in the axial direction of the rack shaft 14 that engages with the pinion shaft 13.

Figure 2:
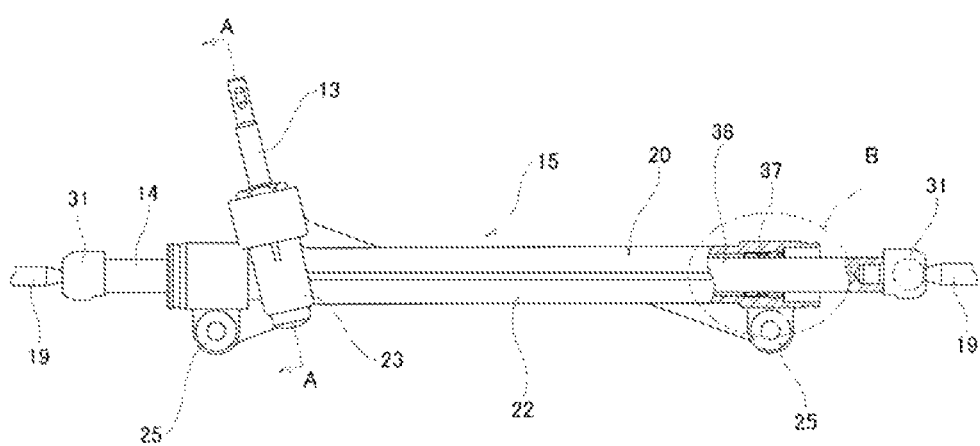
FIG. 2 is a partial cross-sectional view of the rack and pinion steering gear unit of the first example.
Figure 3:
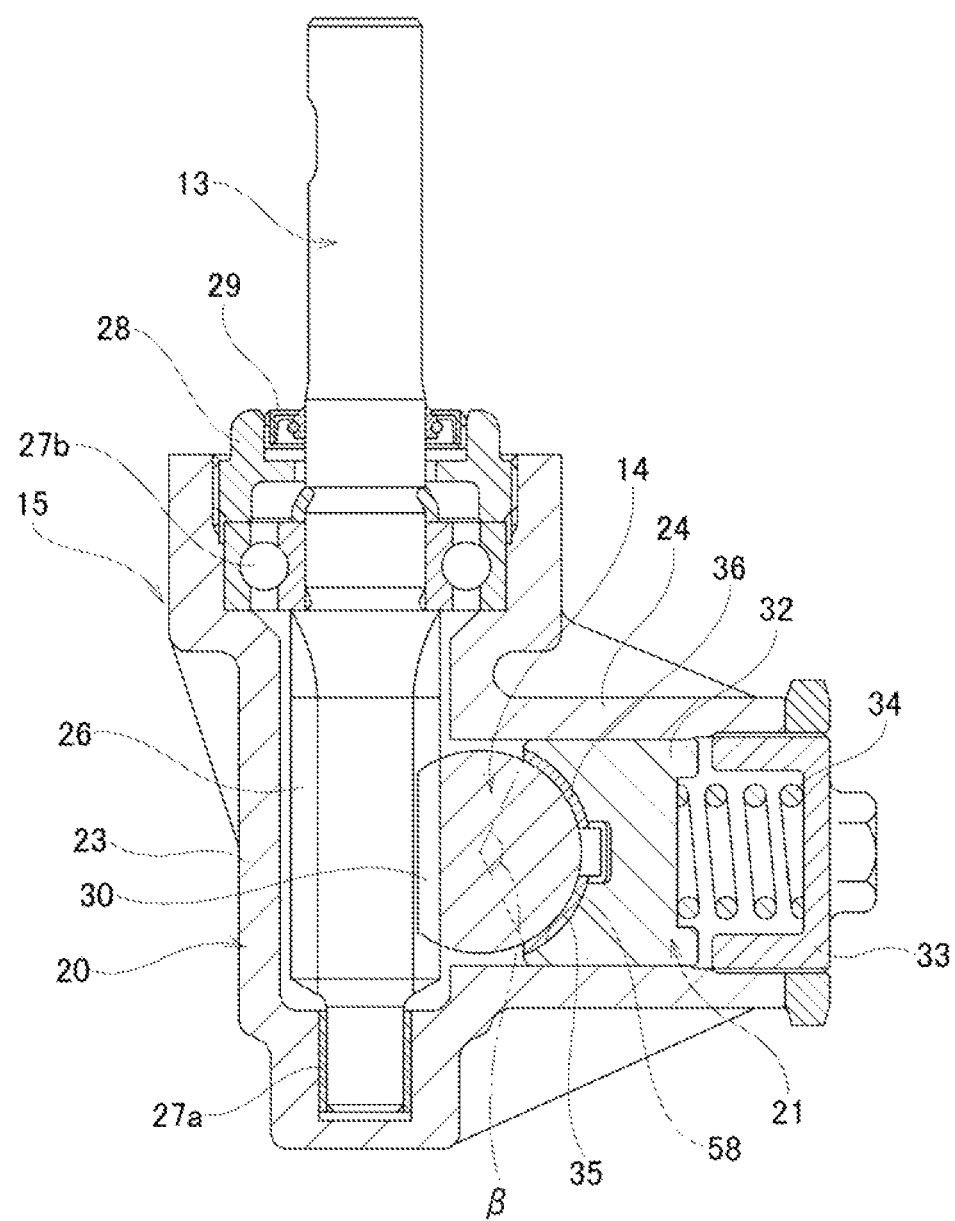
FIG. 3 is a cross-sectional view of section A-A of FIG. 2.
Figure 4:
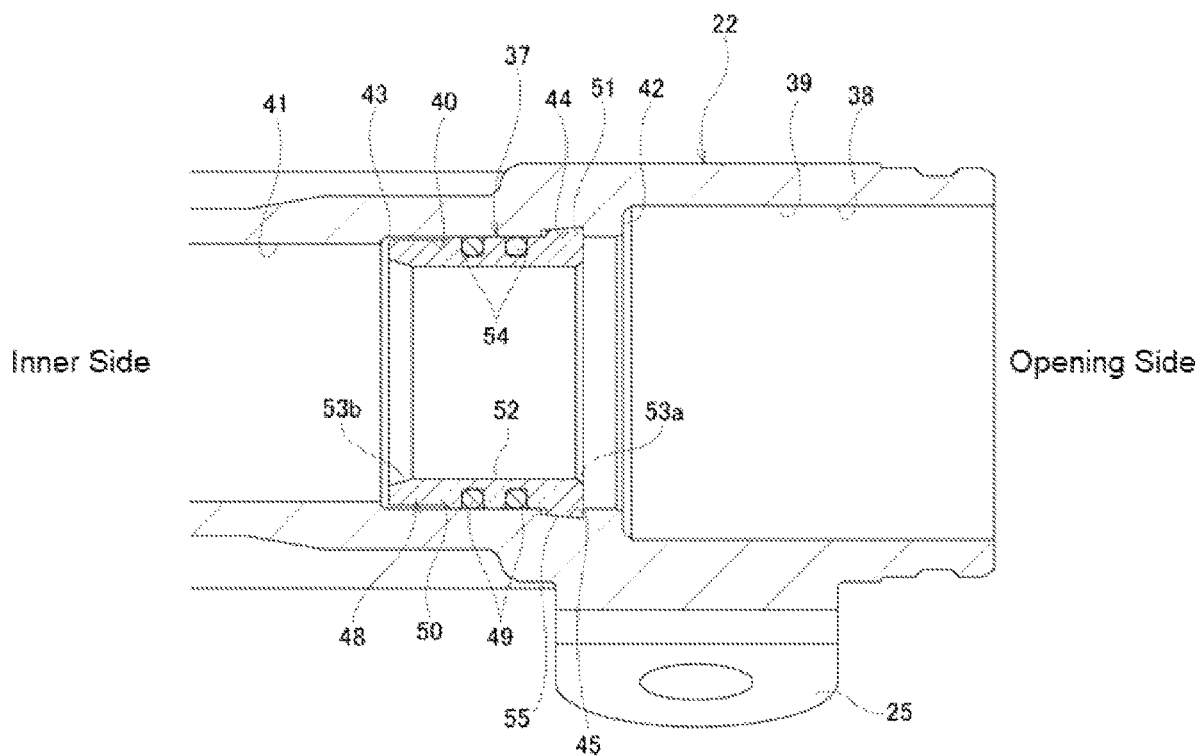
FIG. 4 is an enlarged view of part B in FIG. 2 with a rack shaft omitted.
Figure 5:
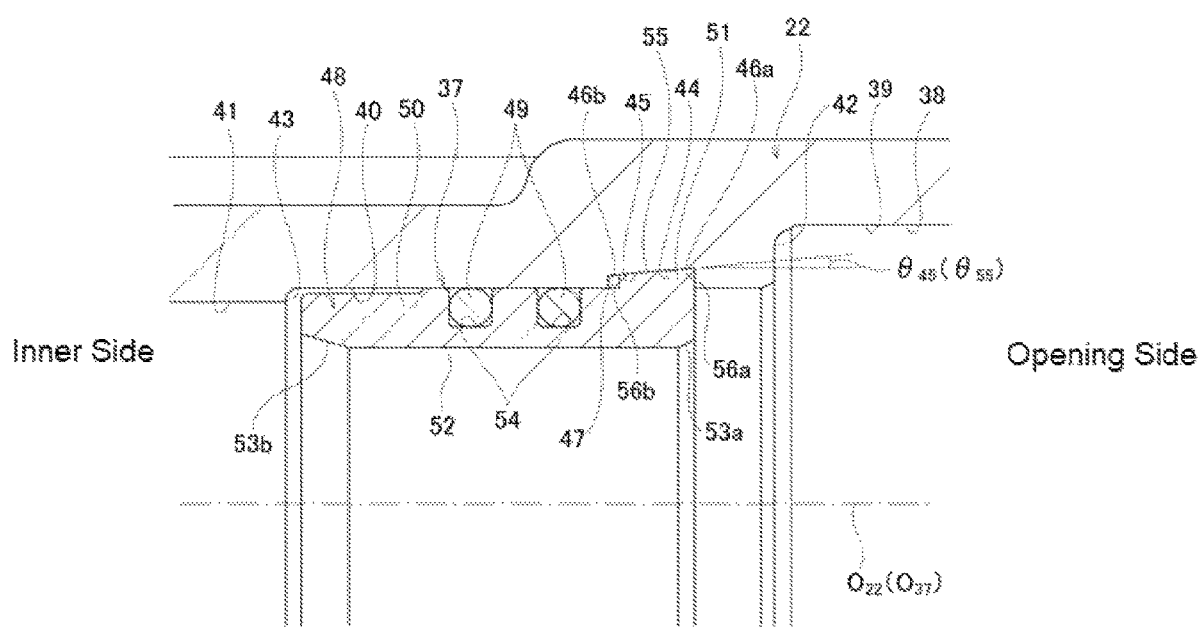
FIG. 5 is an enlarged view of the upper portion of FIG. 4.
Figure 6:
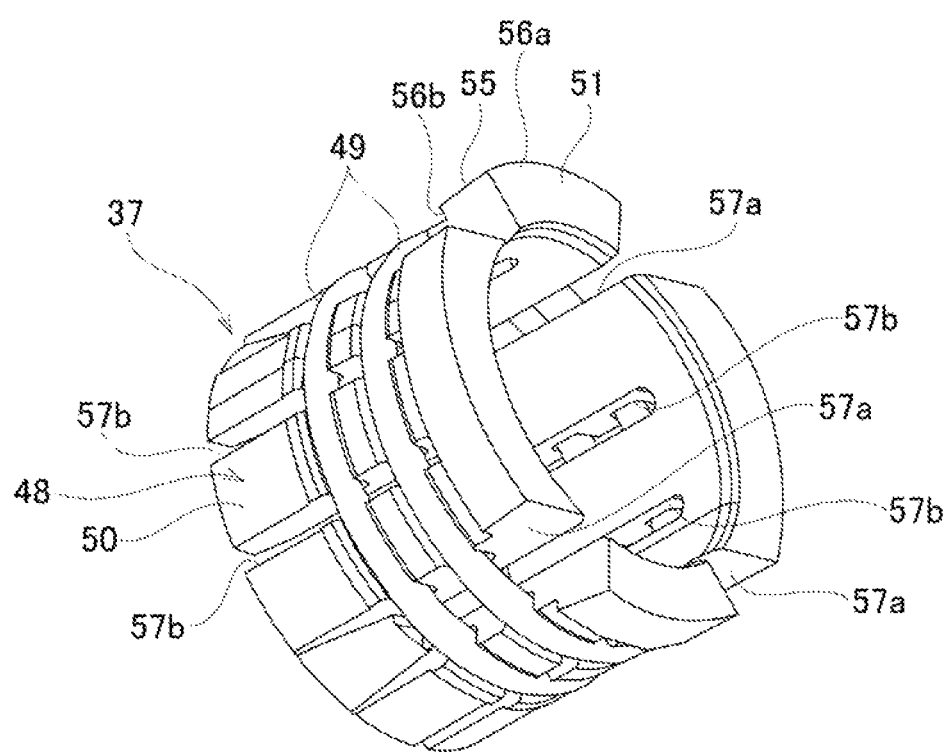
FIG. 6 is a perspective view of a rack bush of the rack and pinion steering gear unit of the first example.
Figure 7:
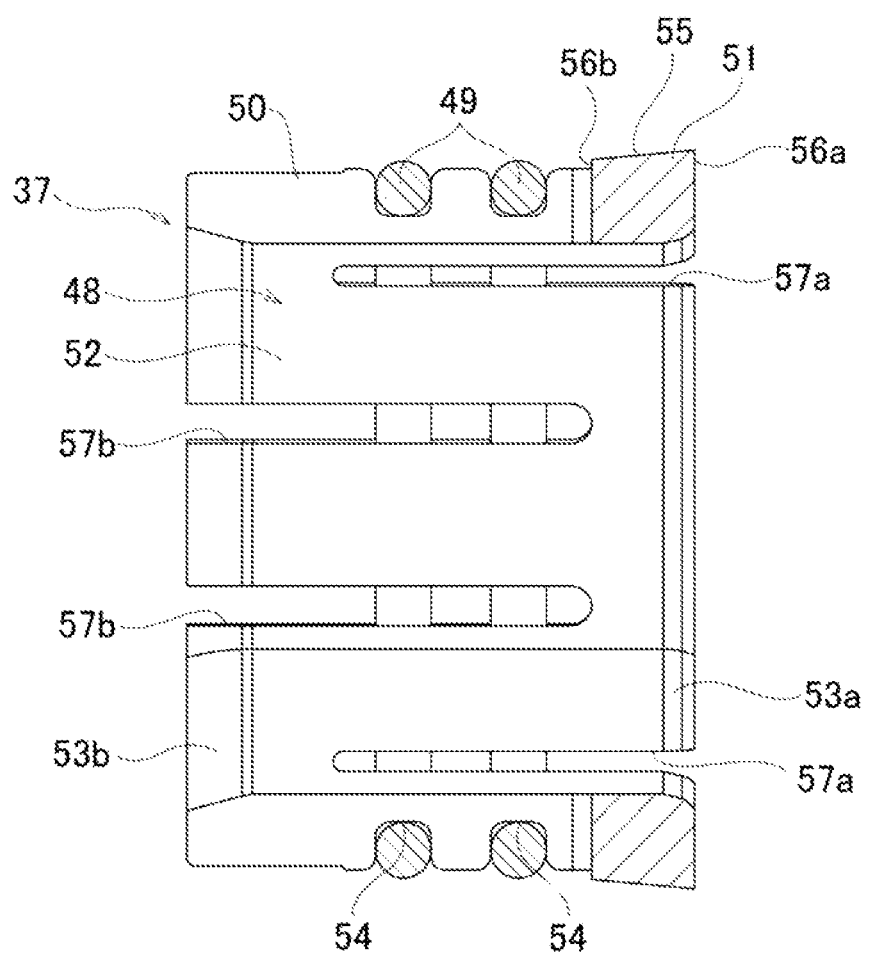
FIG. 7 is a cross-sectional view of the rack bush illustrated in FIG. 6.

As illustrated in FIG. 2 and FIG. 3, the steering gear unit 15 comprises a housing 20, a rack bush 37, a pinion shaft 13, and a rack shaft 14. The steering gear unit 15 of the present example further comprises a pressing mechanism 21.

The housing 20 can be fixed to the vehicle, and comprises a rack housing 22 that houses the middle section in the axial direction of the rack shaft 14, a pinion housing 23 that houses the half tip section of the pinion shaft 13, a cylinder portion 24 that houses the pressing mechanism 21, and a pair of mounting flange portions 25 for fixing the housing 20 to the vehicle. The housing 20 is integrally formed by die-casting a light alloy such as an aluminum alloy. The internal space of the rack housing 22, the internal space of the pinion housing 23, and the internal space of the cylinder portion 24 communicate with each other.

The rack housing 22 has a tubular shape with both sides open in the axial direction, more specifically, a cylindrical shape extending in the left-right direction, and both sides in the axial direction located on both the left and right sides are open. The rack housing 22 is arranged so as to extend substantially horizontally and in the width direction of the vehicle.

The pinion housing 23 has a bottomed cylindrical shape, and only the upper end is open. The pinion housing 23 is arranged on the front side of the rack housing 22 (left side in FIG. 3) at a position biased toward one side in the axial direction of the rack housing 22 (left side in FIG. 2). The pinion housing 23 is arranged at a skew position with respect to the rack housing 22. That is, the center axis of the pinion housing 23 and the center axis of the rack housing 22 are on skew lines. When viewed from the forward-backward direction, the center axis of the pinion housing 23 is not arranged in a direction orthogonal to the center axis of the rack housing 22, but is arranged so as to be inclined with respect to the orthogonal direction.

The cylinder portion 24 has a generally cylindrical shape. The cylinder portion 24 is arranged on the rear side of the rack housing 22 (the right side in FIG. 3) at a position biased toward the one side in the axial direction of the rack housing 22. Specifically, the cylinder portion 24 is arranged at the same position as the pinion housing 23 with respect to the axial direction of the rack housing 22. The cylinder portion 24 extends in the forward-backward direction in the direction orthogonal to the rack housing 22. That is, the center axis of the cylinder portion 24 is arranged in the direction orthogonal to the center axis of the rack housing 22.

The pair of mounting flange portions 25 are arranged on the front side of the rack housing 22 so as to be separated from each other in the axial direction of the rack housing 22. The housing 20 is fixed to the vehicle by fixing members such as bolts and studs respectively inserted into each of the mounting flange portions 25.

The pinion shaft 13 has pinion teeth 26 at a portion near the tip end of the outer peripheral surface. The half tip section of the pinion shaft 13 is arranged inside the pinion housing 23, and the pinion shaft 13 is rotatably supported by a pair of bearings 27a, 27b with respect to the pinion housing 23. Specifically, the tip end portion of the pinion shaft 13 is rotatably supported by a sliding bearing 27a on the innermost side portion of the pinion housing 23, and the middle section of the pinion shaft 13 is rotatably supported by a single row rolling bearing (ball bearing) 27b such as a deep groove type, a three-point contact type, or a four-point type in the vicinity of the opening portion of the pinion housing 23. A holding screw cylinder 28 is screwed to the open end of the pinion housing 23, and the axial position of the rolling bearing 27b is regulated. The gap between the inner peripheral surface of the holding screw cylinder 28 and the outer peripheral surface of the pinion shaft 13 is covered by a seal ring 29.

The rack shaft 14 is made of metal such as carbon steel or stainless steel, and has rack teeth 30 at positions biased to the one side in the axial direction on the front surface. The outer peripheral surface of the rack shaft 14 is configured by a cylindrical surface except for a portion provided with the rack teeth 30. That is, the portion of the rack shaft 14 that deviates from the rack teeth 30 in the axial direction has a circular cross-sectional shape, and the portion of the rack shaft 14 that overlaps the rack teeth 30 in the axial direction has an arcuate cross-sectional shape. The rack shaft 14 is arranged inside the rack housing 22 so as to be able to reciprocate in the axial direction, and the rack teeth 30 are meshed with the pinion teeth 26. The end potions of the rack shaft 14 on both sides in the axial direction protrude from the opening sections of the rack housing 22, and are connected to the base end sections of the tie rods 19 via spherical joints 31. The tip end portions of the tie rods 19 are pivotally supported by the tip end portions of knuckle arms (not shown) respectively. The rack shaft 14 does not rotate around its own center axis due to the engagement between the pinion teeth 26 and the rack teeth 30.

The pressing mechanism 21 presses a pressed section 58 provided on the outer peripheral surface of the rack shaft 14 on the back surface located on the opposite side in the radial direction from the front surface provided with the rack teeth 30 toward the pinion shaft 13. The pressing mechanism 21 of the present example comprises a rack guide 32 arranged in the cylinder portion 24, a cover 33 screwed into an opening section of the cylinder portion 24, and a coil spring 34 arranged between the rack guide 32 and the cover 33. The rack guide 32 is arranged inside the cylinder portion 24 so as to be able to move in the forward-backward direction, which is the axial direction of the cylinder portion 24, that is, to move away from and near to the pinion shaft 13. The rack guide 32 is generally column shaped, and has a pressing concave section 35 having a partially cylindrical concave surface that matches the shape of the back surface (pressed section 58) of the rack shaft 14 on the end surface on the front side facing the back surface (pressed section 58) of the rack shaft 14 in order to slidably support the rack shaft 14. A synthetic resin sheet 36 having excellent slidability is attached to the surface of the pressing concave section 35.

The pressing mechanism 21 elastically presses the rack shaft 14 toward the pinion shaft 13 so as to eliminate backlash at the area of engagement between the pinion teeth 26 and the rack teeth 30. Further, the pressing mechanism 21 properly maintains the meshed state of the pinion teeth 26 and the rack teeth 30 regardless of the force applied to the rack shaft 14 in the direction away from the pinion shaft 13 due to the power transmission at the area of engagement.

The steering gear unit 15 of the present example comprises a rack bush 37 that is fitted inside the rack housing 22 in order to support the rack shaft 14 inside the rack housing 22 so as to enable the rack shaft 14 to smoothly displace in the axial direction. In the present example, the rack bushes 37 are internally fitted in the vicinity of the opening sections on both sides in the axial direction of the rack housing 22 respectively. In the steering gear unit 15 of the present example, as the rack shaft 14 is supported by the inner peripheral surface of the rack bushes 37 arranged on both sides in the axial direction of the rack housing 22 slidably in the axial direction, the rack shaft 14 is arranged inside the rack housing 22 so as to be able to displace in the axial direction without any looseness. However, from the viewpoint of supporting the rack shaft 14 inside the rack housing 22 so as to be enable smooth displacement in the axial direction, it is possible to arrange a rack bush 37 only in the vicinity of the opening section on the side away from the area of engagement between the rack teeth 30 and the pinion teeth 26 in the axial direction of the rack housing 22, and to omit the rack bush arranged in the vicinity of the opening section on the side close to the area of engagement between the rack teeth 30 and the pinion teeth 26 in the axial direction.

The structure of the portion of the rack housing 22 in which the rack bush 37 is internally fitted and the structure of the rack bush 37 will be specifically explained with reference to FIG. 4 to FIG. 7. Note that, in the following explanation, the both sides in the axial direction (both left and right sides) of the rack housing 22 correspond to the opening side (one side in the axial direction) of the rack housing 22, and the center side in the axial direction of the rack housing 22 corresponds to the inner side (the other side in the axial direction) of the rack housing 22. Further, since the structure of the respective rack bush 37 and the structure of the portion of the rack housing 22 in which the rack bush 37 is fitted are symmetrical in the axial direction (left-right direction), of the rack bush 37 on the side away from the area of engagement between the pinion teeth 26 and the rack teeth 30 in the axial direction (the right side in FIG. 2) and the rack housing 22, only the structure of the portion in which the rack bush 37 on the side away from the area of engagement is fitted will be explained.

The rack housing 22 of the present example comprises an engaging concave section 44 on an inner peripheral surface thereof. More specifically, the rack housing 22 has a rack insertion hole 38 which is a stepped hole for inserting the rack shaft 14 on the inner peripheral surface of the end portion in the axial direction. The rack insertion hole 38 comprises an opening hole portion 39 having a large-diameter and a predetermined axial length at the end portion on the opening side, and comprises a support hole portion 40 having an inner diameter smaller than the inner diameter of the opening hole portion 39 and having a predetermined axial length in a portion adjacent to the inner side of the opening hole portion 39. The rack housing 22 comprises a center hole portion 41 having an inner diameter smaller than the inner diameter of the support hole portion 40 in a portion of the inner peripheral surface adjacent to the inner side of the support hole portion 40. Further, the rack housing 22 comprises a large-diameter stepped surface 42 facing the opening side of the rack housing 22 between the opening hole portion 39 and the support hole portion 40 in the rack insertion hole 38, as well as a small-diameter stepped surface 43 facing the opening side of the rack housing 22 between the support hole portion 40 and the center hole portion 41.

The support hole portion 40 is a portion that internally fits and supports the rack bush 37. The support hole portion 40 comprises an engaging concave section 44 formed over the entire circumference of the inner peripheral surface thereof in the vicinity of the end portion on the opening side of the rack housing 22. The engaging concave section 44 has a generally lateral trapezoidal cross-sectional shape.

The bottom surface (inner peripheral surface) of the engaging concave section 44 is configured by a bottom inclined surface 45 that is inclined outward in the radial direction toward the opening side (one side in the axial direction) of the rack housing 22. The bottom inclined surface 45 is configured by a partially conical concave surface having a linear cross-sectional shape (bus line shape). That is, the groove depth of the engaging concave section 44 increases toward the opening side of the rack housing 22. The inclination angle $\theta_{45}$ of the bottom inclined surface 45 with respect to the center axis $O_{22}$ of the rack housing 22 is, for example, 1 degree to 45 degrees, and it is 5 degrees in the illustrated example.

The engaging concave section 44 has inside surfaces in the axial direction 46a, 46b that are arranged parallel to each other and configured by circular ring shaped flat planes existing on an imaginary flat plane orthogonal to the center axis $O_{22}$ of the rack housing 22.

The rack bush 37 comprises a rack bush body 48 and a pair of elastic rings 49 fitted around the rack bush body 48. In a state where the rack bush 37 is fitted and supported in the rack housing 22, the center axis $O_{37}$ of the rack bush 37 coincides with the center axis $O_{22}$ of the rack housing 22.

The rack bush body 48 is integrally formed of an elastic synthetic resin such as a polyacetal resin, a polyamide resin, a polyethylene resin, and a tetrafluoroethylene resin. The rack bush body 48 of the present example integrally comprises a tubular body 50 having a generally cylindrical shape, and an engaging convex section 51 having an outward collar shape that protrudes outward in the radial direction from the outer peripheral surface of the tubular body 50. In the present example, the rack bush body 48 is an integrally molded product obtained by injection molding a synthetic resin. The length in the axial direction of the rack bush body 48 is approximately the same as or slightly shorter than the length in the axial direction of the support hole portion 40. At least the middle section in the axial direction of the tubular body 50 has an outer diameter substantially equal to or slightly larger than the inner diameter of the support hole portion 40 of the rack housing 22 in a free state.

The inner peripheral surface of the middle section in the axial direction of the tubular body 50 comprises a cylindrical surface-shaped guide surface 52 for slidably supporting the rack shaft 14, and the inner peripheral surface of both end portions in the axial direction of the tubular body 50 comprise tapered surfaces 53a, 53b having an inner diameter that becomes larger as the distance from the guide surface 52 increases. The tapered surfaces 53a, 53b are provided to ensure the air permeability of the interior of the rack housing 22 and to improve the insertability of the rack shaft 14. The tubular body 50 comprises a pair of locking grooves for locking the elastic rings 49 at two positions separated in the axial direction on the outer peripheral surface. The locking grooves 54 have a generally rectangular cross-sectional shape.

The engaging convex section 51 is provided in a portion located on the opening side of the rack housing 22 of the tubular body 50 of the rack bush body 48 (the end portion in the present example), and is arranged inside the engaging concave section 44 in a state where the rack bush 37 is fitted inside the support hole portion 40 of the rack housing 22. The engaging convex section 51 has a generally lateral trapezoidal cross-sectional shape. The width in the axial direction of the engaging convex section 51 is smaller than the width in the axial direction of the engaging concave section 44.

In the present example, the top surface (outer peripheral surface) of the engaging convex section 51 is configured by a top inclined surface 55 that is inclined in a direction toward outside in the radial direction toward the opening side of the rack housing 22. The top inclined surface 55 is configured by a partially conical convex surface having a linear cross-sectional shape (bus line shape). The top inclined surface 55 of the engaging convex section 51 is inclined in the same direction as the bottom inclined surface 45 of the engaging concave section 44, and the amount of protrusion in the radial direction of the engaging convex section 51 from the outer peripheral surface of the tubular body 50 becomes larger toward the opening side of the rack housing 22. The amount of protrusion in the radial direction (maximum value) at the end portion of the opening side of the rack housing 22 of the engaging convex section 51 is the same as or slightly greater than the groove depth (maximum value) at the end portion of the opening side of the rack housing 22 of the engaging concave section 44. The amount of protrusion in the radial direction (minimum value) at the end portion of the inner side of the rack housing 22 of the engaging convex section 51 is greater than the groove depth (minimum value) at the end portion of the inner side of the rack housing 22 of the engaging concave section 44.

The inclination angle $\theta_{55}$ of the top inclined surface 55 with respect to the center axis $O_{37}$ of the rack bush 37 is, for example, 1 degree to 45 degrees, and it is 5 degrees in the illustrated example. That is, in the present example, the inclination angle $\theta_{45}$ of the bottom inclined surface 45 with respect to the center axis $O_{22}$ of the rack housing 22 and the inclination angle $\theta_{55}$ of the top inclined surface 55 with respect to the center axis $O_{37}$ of the rack bush 37 are the same.

The engaging convex section 51 has outside surfaces in the axial direction 56a, 56b that are arranged so as to be parallel to each other and comprise circular ring shaped flat planes that exist on an imaginary flat plane orthogonal to the center axis $O_{37}$ of the rack bush 37.

The rack bush body 48 comprises first axial slits 57a formed from the end portion of the opening side of the rack housing 22 to the middle section in the axial direction so as to be spaced in the circumferential direction, and comprises second axial slits 57b formed from the end portion of the inner side of the rack housing 22 to the middle section in the axial direction so as to be spaced in the circumferential direction. In the illustrated example, the rack bush body 48 comprises four first axial slits 57a and eight second axial slits 57b. With this kind of construction, the rack bush body 48 can expand or contract in the radial direction. The tubular body 50 and the engaging convex section 51 of the rack bush body 48 are discontinuous in the circumferential direction at portions where the first axial slits 57a and the second axial slits 57b exist.

The elastic rings 49 are made of an elastic material such as natural rubber, synthetic rubber, or a thermoplastic synthetic resin having elasticity, and has a circular cross-sectional shape in a free state like an O-ring. In a free state, the elastic rings 49 has an outer diameter larger than the inner diameter of the support hole portion 40 of the rack housing 22 and an inner diameter smaller than the outer diameter of the bottom surfaces of the locking grooves 54 of the rack bush body 48. In a free state, the elastic rings 49 have a wire diameter larger than the groove depth of the locking grooves 54. The elastic rings 49 are locked in the locking grooves 54 of the rack bush body 48 so as to cross the first axial slits 57a and the second axial slits 57b and elastically fitted around the rack bush body 48.

In order to assemble the rack bush 37 to the rack housing 22, first, reduce the width in the circumferential direction of the first axial slits 57a and the second axial slits 57b by locking the elastic rings 49 to the locking grooves 54 of the rack bush body 48 so as to reduce the diameter of the rack bush body 48. Then, in a state where the diameter of the rack bush 37 is further reduced by using a predetermined jig, insert the rack bush 37 into the rack insertion hole 38 of the rack housing 22. When doing this, the insertion direction of the rack bush 37 is restricted so that the engaging convex section 51 is located on the rear side with respect to the insertion direction of the rack bush 37.

Once the rack bush 37 is inserted until the engaging convex section 51 is located on the inner diameter side of the engaging concave section 44, the jig is removed from the rack bush 37 to expand the diameter of the rack bush 37. By doing this, the engaging convex section 51 is made to enter the inside of the engaging concave section 44. When doing this, the elastic restoring force of the rack bush body 48 presses the top inclined surface 55 of the engaging convex section 51 toward outside in the radial direction against the bottom inclined surface 45 of the engaging concave section 44.

After that, the diameter of the rack bush 37 is further expanded by inserting the rack shaft 14 into the inside of the rack bush 37 (rack bush body 48). By doing so, the pressing force of the top inclined surface 55 against the bottom inclined surface 45 toward outside in the radial direction is increased. Also, the elastic rings 49 are elastically compressed between the bottom surfaces of the locking grooves 54 and the inner peripheral surface of the support hole portion 40, and the middle section in the axial direction of the outer peripheral surface of the rack bush body 48 is made to elastically come in contact with the inner peripheral surface of the support hole portion 40. Further, the guide surface 52 provided on the inner peripheral surface of the rack bush body 48 is elastically pressed against the outer peripheral surface of the rack shaft 14 to hole the rack shaft 14 without any looseness. After that, the tie rods 19 are connected to the end portions of both sides in the axial direction of the rack shaft 14 via spherical joints 31.

With the steering gear unit 15 of the present example as described above, it is possible to support the rack bush 37 with respect to the rack housing 22 without any looseness in the axial direction even if the rack bush 37 is not held in the axial direction between two members.

That is, when the top inclined surface 55 of the engaging convex section 51 is pressed against the bottom inclined surface 45 of the engaging concave section 44 toward outside in the radial direction, a reaction force (component force) toward the opening side of the rack housing 22 acts on the rack bush 37 due to the inclination of the bottom inclined surface 45 which is the bottom surface of the engaging concave section 44. Therefore, by using the reaction force, it is possible to press one outside surface in the axial direction 56a of the outside surfaces in the axial direction 56a, 56b of the engaging convex section 51, which is located on the opening side of the rack housing 22 and is a surface of the rack bush 37 facing the opening side of the rack housing 22, against one inside surface in the axial direction 46a of the inside surfaces in the axial direction 46a, 46b of the engaging concave section 44, which is located on the opening side of the rack housing 22 and is a surface facing the inner side of the inner peripheral surface of the rack housing 22, in the axial direction.

In other words, as the bottom inclined surface 45 which is the bottom surface of the engaging concave section 44 is inclined, the engaging convex section 51 is guided to the opening side of the rack housing 22 along the bottom inclined surface 45 when the top inclined surface 55 is pressed toward outside in the radial direction, and the one outside surface in the axial direction 56a of the engaging convex section 51 is pressed in the axial direction with respect to the one inside surface in the axial direction 46a of the engaging concave section 44. Due to this, the one outside surface in the axial direction 56a of the engaging convex section 51 and the one inside surface in the axial direction 46a of the engaging concave section 44 can come in contact without gaps. That is, in the present example, the one outside surface in the axial direction 56a of the engaging convex section 51 forms the first surface, and the one inside surface in the axial direction 46a of the engaging concave section 44 forms the second surface. In the present example, since the one outside surface in the axial direction 56a of the engaging convex section 51 and the one inside surface in the axial direction 46a of the engaging concave section 44 come in contact without gaps, even when a force in the axial direction (friction force) toward opening side of the rack housing 22 acts on the rack bush 37 from the rack shaft 14 when the rack shaft 14 slides in the axial direction, the rack bush 37 is prevented from displacing toward the opening side of the rack housing 22.

When the one outside surface in the axial direction 56a of the engaging convex section 51 is pressed against the one inside surface in the axial direction 46a of the engaging concave section 44, a gap 47 becomes to exist between the other outside surface in the axial direction 56b of the engaging convex section 51 and the other inside surface in the axial direction 46b of the engaging concave section 44. However, in order to displace the rack bush 37 toward the inner side of the rack housing 22 when the force in the axial direction (friction force) toward the inner side of the rack housing 22 acts from the rack shaft 14 to the rack bush 37, it is necessary to deform the engaging convex section 51 toward the inner diameter side along the bottom inclined surface 45 against the elastic restoring force of the rack bush body 48. Therefore, it is also effectively prevented that the rack bush 37 is displaced to the inner side of the rack housing 22.

In the present example, the rack bush 37 can be supported by the rack housing 22 without any looseness in the axial direction even if the rack bush 37 is not held in the axial direction between two members. Therefore, it is also possible to effectively prevent occurrence of noise due to the rack bush 37 rattling in the axial direction.

In the present example, the top inclined surface 55 which is the top surface of the engaging convex section 51 is made to have a tapered shape that is inclined in a direction in which the outer diameter becomes smaller toward the front side (the inner side of the rack housing 22) with respect to the insertion direction of the rack bush 37, it is possible to improve the workability of the work of inserting the rack bush 37 into the rack insertion hole 38 as well as to make the rack bush 37 difficult to come out from the rack housing 22. Further, since the inclination angle $\theta_{55}$ of the top inclined surface 55 and the inclination angle $\theta_{45}$ of the bottom inclined surface 45 are made to be the same, the top inclined surface 55 and the bottom inclined surface 45 can be brought into surface contact. Therefore, the contact state between the top inclined surface 55 and the bottom inclined surface 45 can be stabilized so as to effectively prevent the engaging convex section 51 from rattling in the axial direction with respect to the engaging concave section 44.

In the steering apparatus 11 of the present example, when the steering wheel 12 is steered to the steering limit, the spherical joints 31 (sockets of the spherical joints 31) connected to the end portions of both sides in the axial direction of the rack shaft 14 collide with the large-diameter stepped surface 42 of the rack housing 22 directly or via cylindrical stopper members (not shown). Therefore, even at the time of so-called end contact, a large load force in the axial direction does not act on the rack bush 37. Accordingly, it is also advantageous in terms of stabilizing the posture of the rack bush 37.

Second Example

Figure 8:
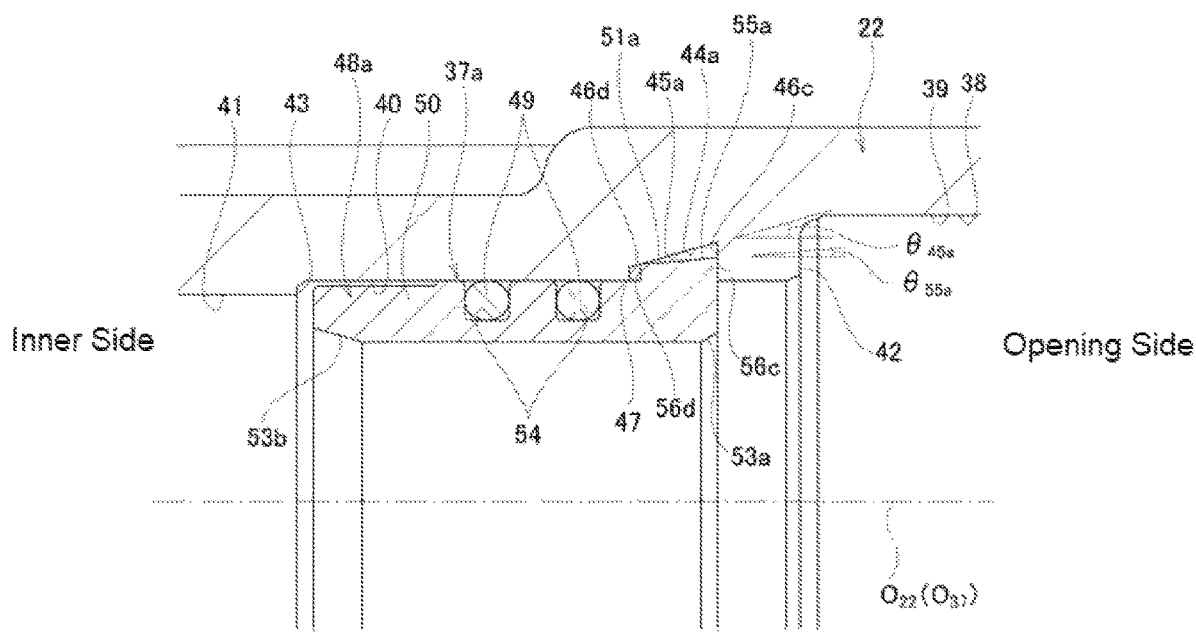
FIG. 8 is a view corresponding to FIG. 5, illustrating a second example of an embodiment of the present invention.

FIG. 8 illustrates a second example of an embodiment of the present invention. The present example is a modified example of the first example. In the present example, the inclination angle $\theta_{45a}$ of the bottom inclined surface 45a provided on the bottom surface of the engaging concave section 44a is made larger than the inclination angle $\theta_{55a}$ of the top inclined surface 55a provided on the top surface of the engaging convex section 51a ($\theta_{45a} > \theta_{55a}$).

In the illustrated example, the inclination angle $\theta_{45a}$ of the bottom inclined surface 45a is 16 degrees, and the inclination angle $\theta_{55a}$ of the top inclined surface 55a is 5 degrees.

As the inclination angle $\theta_{45a}$ of the bottom inclined surface 45a is larger than the inclination angle $\theta_{55a}$ of the top inclined surface 55a, in a state where the engaging convex section 51a is arranged inside the engaging concave section 44a, the top inclined surface 55a and the bottom inclined surface 45a do not come into contact with each other, and only the end portion of the inner side (the portion on the small-diameter side) of the rack housing 22 in the top inclined surface 55a comes into contact with the bottom inclined surface 45a. Due to this, of the top inclined surface 55a, the end portion of the inner side of the rack housing 22 is pressed toward outside in the radial direction against the bottom inclined surface 45a. In the present example, the top inclined surface 55a and the bottom inclined surface 45a are in line contact with each other.

By pressing the top inclined surface 55a against the bottom inclined surface 45a toward outside in the radial direction, it is possible to press the outside surface in the axial direction 56c of the outside surfaces in the axial direction 56c, 56d, which is located on the opening side of the rack housing 22, in the axial direction against one inside surface in the axial direction 46c of the inside surfaces in the axial direction 46c, 46d, which is located on the opening side of the rack housing 22. Due to this, one outside surface in the axial direction 56c of the engaging convex section 51a and the one inside surface in the axial direction 46c of the engaging concave section 44a can be brought into contact without gaps. Therefore, even when a force in the axial direction toward the opening side of the rack housing 22 acts from the rack shaft 14 to the rack bush 37a when the rack shaft 14 slides in the axial direction, it is possible to prevent the rack bush 37a from displacing toward the opening side of the rack housing 22.

In order to move the rack bush 37a to the inner side of the rack housing 22 when a force in the axial direction toward the inner side of the rack housing 22 acts from the rack shaft 14 to the rack bush 37a, it is necessary to deform the engaging convex section 51a toward the inner diameter side along the bottom inclined surface 45a against the elastic restoring force of the rack bush body 48a. Therefore, it is also effectively prevented that the rack bush 37a is displaced to the inner side of the rack housing 22. Accordingly, a gap 47 remains between the other outside surface in the axial direction 56d of the engaging convex section 51a and the other inside surface in the axial direction 46d of the engaging concave section 44a.

In the case of this example as well, the rack bush 37a can be supported by the rack housing 22 without any looseness in the axial direction. The other configuration and operational effects are the same as those of the first example.

Third Example

Figure 9:
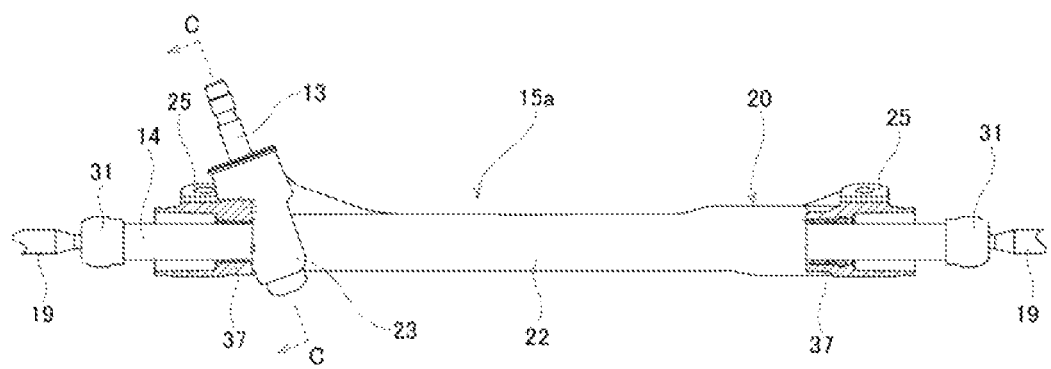
FIG. 9 is a view corresponding to FIG. 2, illustrating a third example of an embodiment of the present invention.
Figure 10:
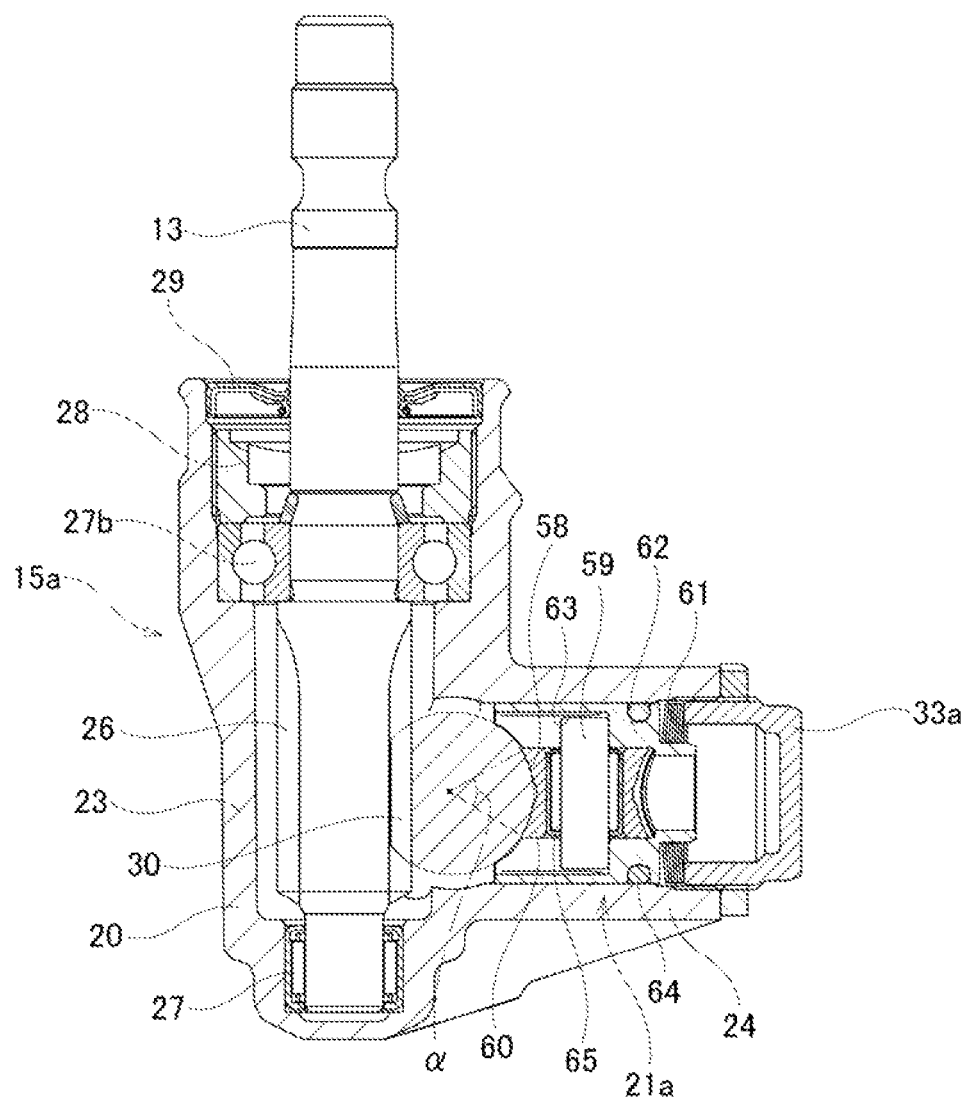
FIG. 10 is a cross-sectional view of section C-C of FIG. 9.
Figure 11:
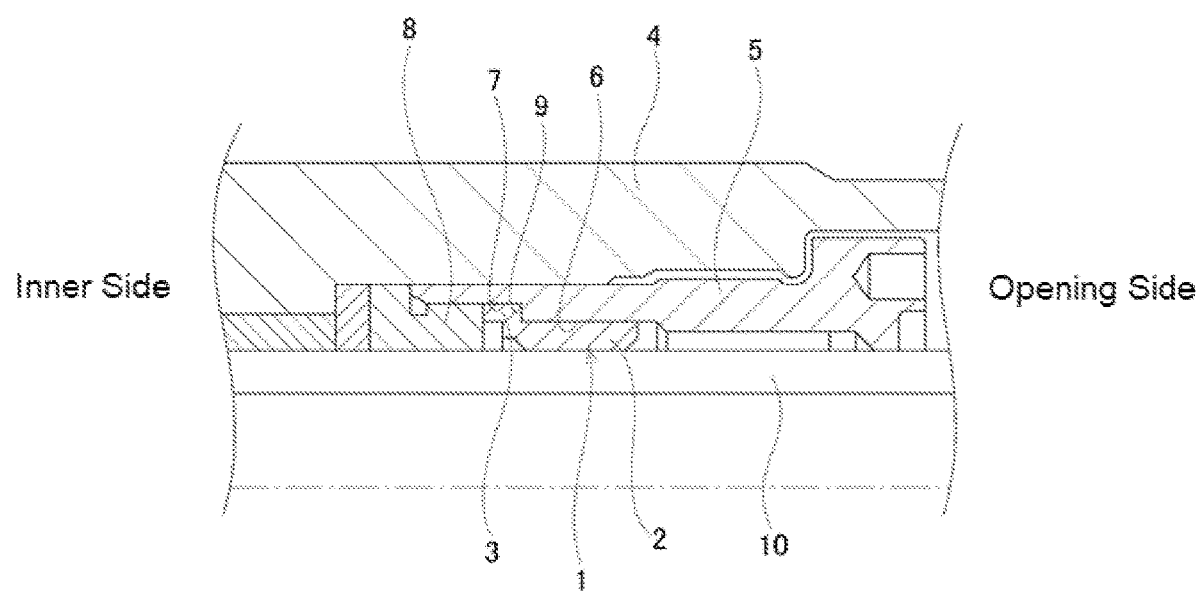
FIG. 11 is a view corresponding to FIG. 5, illustrating a conventional construction of a support portion of a rack shaft by a rack bush.

FIG. 9 to FIG. 10 illustrate a third example of an embodiment of the present invention. In the steering gear unit 15a of the present example, the structure of the pressing mechanism 21a that presses the front surface provided with the rack teeth 30 and the rear surface located on the opposite side in the radial direction of the outer peripheral surface of the rack shaft 14 against the pinion shaft 13 is different from that of the pressing mechanism 21 of the first example. The pressing mechanism 21a of the present example is housed inside the cylinder portion 24 of the rack housing 22, and comprises a pivot shaft 59, a pressing roller 60, and an elastic member 61.

The pivot shaft 59 is arranged so as to be parallel to the rack shaft 14 and to be able to move away from and near to the rack shaft 14 in the axial direction of the cylinder portion 24. In order for this, a pressing block 62 is fitted inside the cylinder portion 24 movably in the forward-backward direction, which is the axial direction of the cylinder portion 24, and the pivot shaft 59 is engaged inside the slot 63 opened in the front surface of the pressing block 62 without any looseness in the axial direction of the rack shaft 14. In the illustrated example, the O-ring 64 locked on the outer peripheral surface of the pressing block 62 is elastically being in sliding contact with the inner peripheral surface of the cylinder portion 24.

The pressing roller 60 is rotatably supported around the pivot shaft 59 by a radial needle bearing 65, and its outer peripheral surface comes in contact with the pressed section 58 provided on the rear surface of the rack shaft 14. The outer peripheral surface of the pressing roller 60 has a bush line shape that follows the cross-sectional shape of the rear surface of the rack shaft 14 (pressing section 58).

The elastic member 61 comprises one or a plurality of disc springs or coil springs, and presses the pivot shaft 59 toward the rack shaft 14 in the axial direction of the cylinder portion 24. In the present example, the elastic member 61 is composed of a disc spring arranged between the cover 33a screwed into the opening section of the cylinder portion 24 and the pressing block 62.

The pressing mechanism 21a presses the pivot shaft 59 toward the front side by pressing the pressing block 62 toward the front side based on the elasticity of the elastic member 61, and presses the pressed section 58 of the rack shaft 14 by the outer peripheral surface of the pressing roller 60 which is rotatably supported around the pivot shaft 59. As a result, the backlash of the area of engagement between the pinion teeth 26 and the rack teeth 30 is eliminated, and the engaging state between the pinion teeth 26 and the rack teeth 30 is properly maintained regardless of the force applied to the rack shaft 14 in the direction away from the pinion shaft 13 due to the power transmission at the area of engagement.

In the steering gear unit 15a of the present example, the pressing roller 60 rotates when the rack shaft 14 slides in the axial direction, so the sliding resistance of the rack shaft 14 is reduced.

In the present example, the structure for slidably supporting the rack shaft 14 in the rack housing 22 is the same as the structure of the first example. That is, the rack shaft 14 is slidably supported by the rack bush 37 at each of portions in the vicinity of the opening sections on both sides in the axial direction of the rack housing 22, and the engaging convex section 51 provided in the rack bush 37 and the engaging concave section 44 provided in the rack housing 22 are engaged. Therefore, the rack bush 37 can be supported by the rack housing 22 without any looseness in the axial direction even if the rack bush 37 is not held in the axial direction between two members.

The steering gear unit 15a of the present example has a structure in which the pressing section 58 of the rack shaft 14 is pressed toward the pinion shaft 13 by the pressing mechanism 21a having the pressing roller 60. In the pressing mechanism 21a provided with the pressing roller 60, the angle α formed by the contact portion between the outer peripheral surface of the pressing roller 60 and the rear surface of the rack shaft 14 (pressed section 58) tends to be smaller than the angle β formed by the contact portion between the contact portion between the sheet 36 provided in the pressing concave section 35 of the rack guide 32 and the rear surface of the rack shaft 14 (see FIG. 3) in the pressing mechanism 21 of the first example. When the angle formed by the contact portion between the pressing surface of the pressing mechanism 21a and the rear surface of the rack shaft 14 becomes smaller, the rack shaft 14 tends to judder in the axial direction of the pinion shaft 13. Therefore, as in the present example, in the steering gear unit 15a comprising the pressing mechanism 21a having the pressing roller 60, the effect of supporting the rack shaft 14 by the rack bush 37 becomes remarkable. The other configuration and operational effects are the same as those of the first example.

In the case of embodying the present invention, it is possible to appropriately combine each structure of the first example through the third example of an embodiment of the present invention. Further, in the case of embodying the present invention, the bottom surface of the engaging concave section can be inclined in the direction outward in the radial direction toward the inner side of the rack housing regardless of the structure that tilts outward in the radial direction toward the opening side of the rack housing. As for the top surface of the engaging convex section as well, the structure is not limited to a structure that inclines outward in the radial direction toward the opening side of the rack housing, but can also be inclined in the direction outward in the radial direction toward the inner side of the rack housing, or it can also be a cylindrical surface whose outer diameter does not change in the axial direction.

In the case of embodying the present invention, it is possible to apply the structure of the rack bush of the present invention and the structure of a portion into which the rack bush is fitted only to the portion of the rack housing in the vicinity of the opening on the side far from the area of engagement between the rack teeth and the pinion teeth in the axial direction. In this case, in the portion of the rack housing in the vicinity of the opening on the side closer to the area of engagement between the rack teeth and the pinion teeth, the rack bush can be omitted, alternatively, it is possible to employ a rack bush structure and a portion into which the rack bush is fitted that are different from those of the present invention.

In the case of embodying the present invention, the number of the elastic rings fitted around the bush body is not limited to two, and it may be one or three or more, and the elastic rings may also be omitted. Further, the number of the slits in the axial direction (the first axial slits and the second axial slits) formed in the bush body is not limited to the number shown in the first example. If the bush body can be expanded or contracted, the slits in the axial direction can be omitted. Furthermore, in the first example, the shown structure has an engaging convex section which became discontinuous due to the provision of slits in the axial direction, however, the engaging convex section can adopt a shape that is discontinuous in the circumferential direction regardless of the existence of the slits in the axial direction.

REFERENCE SINGS LIST

1 Rack bush
2 Tubular body
3 Engaging convex section
4 Rack housing
5 End case
6 Small-diameter hole
7 Large-diameter hole
8 Stopper
9 Stepped surface
10 Rack shaft
11 Steering apparatus
12 Steering wheel
13 Pinion shaft
14 Rack shaft
15, 15a Steering gear unit
16 Steering shaft
17 Universal joint
18 Intermediate shaft
19 Tie rod
20 Housing
21, 21a Pressing mechanism
22 Rack housing
23 Pinion housing
24 Cylinder portion
25 Mounting flange portions
26 Pinion teeth
27a Sliding bearing
27b Rolling bearing
28 Holding screw cylinder
29 Seal ring
30 Rack teeth
31 Spherical joints
32 Rack guide
33, 33a Cover
34 Coil spring
35 Pressing concave section
36 Sheet
37, 37a Rack bush
38 Rack insertion hole
39 Opening hole portion
40 Support hole portion
41 Center hole portion
42 Large-diameter stepped surface
43 Small-diameter stepped surface
44, 44a Engaging concave section
45, 45a Bottom inclined surface
46a, 46b, 46c, 46d Inside surfaces in the axial direction
47 Gap
48, 48a Rack bush body
49 Elastic ring
50 Tubular body
51, 51a Engaging convex section
52 Guide surface
53a, 53b Tapered surfaces
54 Locking grooves
55, 55a Top inclined surface
56a, 56b, 56c, 56d Outside surfaces in the axial direction
57a First axial slit
57b Second axial slit
58 Pressed section
59 Pivot shaft
60 Pressing roller
61 Elastic member
62 Pressing block
63 Slot
64 O-ring
65 Radial needle bearing

The invention claimed is:

1. A rack and pinion steering gear unit comprising:
a housing having a rack housing having a tubular shape with both sides open in an axial direction of the rack housing and including an engaging concave section on an inner peripheral surface thereof, and a pinion housing;
a rack bush having a tubular body having a substantially cylindrical shape and an engaging convex section protruding outward in a radial direction from an outer peripheral surface of the tubular body and arranged inside the engaging concave section, the rack bush fitted inside the rack housing;
a rack shaft having rack teeth, supported by an inner peripheral surface of the rack bush slidably in the axial direction, and arranged inside the rack housing; and
a pinion shaft having pinion teeth that mesh with the rack teeth on an outer peripheral surface thereof, and rotatably supported inside the pinion housing;
wherein
the engaging convex section is provided in a portion of the rack bush that is located on an opening side of the rack housing;
the engaging concave section comprises a bottom surface inclined in a direction outward in a radial direction as going toward one side in the axial direction of the rack housing;
the engaging convex section comprises a top surface inclined in a direction outward in the radial direction as going toward the one side in the axial direction of the rack housing, with the top surface pressed radially outward with respect to the bottom surface of the engaging concave section, a bottom surface disposed radially inward with respect to the top surface and contacting an outer surface of the rack shaft, and a first surface facing the one side in the axial direction of the rack housing and configured by a flat plane that is orthogonal to a center axis of the rack bush,
the engaging concave section comprises a second surface facing the other side in the axial direction of the rack housing and configured by a flat surface that is orthogonal to a center axis of the rack housing, and
the first surface is pressed in the axial direction against the second surface.

2. The rack and pinion steering gear unit according to claim 1, wherein the one side in the axial direction of the rack housing is the opening side of the rack housing, and the other side in the axial direction of the rack housing is an inner side of the rack housing.

3. The rack and pinion steering gear unit according to claim 1, wherein
the engaging convex section comprises a pair of outside surfaces in the axial direction, and
the first surface is configured by an outside surface in the axial direction of the pair of outside surfaces in the axial direction of the engaging convex section located on the one side in the axial direction of the rack housing, the engaging concave section comprises a pair of inside surfaces in the axial direction, and the second surface is configured by an inside surface in the axial direction of the pair of inside surfaces in the axial direction of the engaging concave section located on the one side in the axial direction of the rack housing.

4. The rack and pinion steering gear unit according to claim 3, wherein the pair of outside surfaces in the axial direction of the engaging convex section is configured by flat planes that are parallel to each other and orthogonal to the center axis of the rack bush.

5. The rack and pinion steering gear unit according to claim 3, wherein the pair of inside surfaces in the axial direction of the engaging concave section is configured by flat surfaces that are parallel to each other and orthogonal to the center axis of the rack housing.

6. The rack and pinion steering gear unit according to claim 1, wherein an inclination angle of the bottom surface of the engaging concave section with respect to the center axis of the rack housing and an inclination angle of the top surface of the engaging convex section with respect to the center axis of the rack bush are the same.

7. The rack and pinion steering gear unit according to claim 1, wherein an inclination angle of the bottom surface of the engaging concave section with respect to the center axis of the rack housing is larger than an inclination angle of the top surface of the engaging convex section with respect to the center axis of the rack bush.

8. The rack and pinion steering gear unit according to claim 1, wherein a cross-sectional shape of the bottom surface of the engaging concave section is linear, and a cross-sectional shape of the top surface of the engaging convex section is linear.

9. The rack and pinion steering gear unit according to claim 1, wherein the rack bush is arranged in a portion of the rack housing in a vicinity of an opening section on a side far from an area of engagement between the rack teeth and the pinion teeth in the axial direction.

10. The rack and pinion steering gear unit according to claim 1, wherein the rack bush is respectively arranged in vicinities of opening sections on both sides in the axial direction of the rack housing.

11. The rack and pinion steering gear unit according to claim 1, wherein a pressing mechanism pressing a pressed section of an outer peripheral surface of the rack shaft located on a side radially opposite to a portion provided with the rack teeth toward the pinion shaft is provided, and the pressing mechanism has a pivot shaft supported movably away from and near to the rack shaft, a pressing roller rotatably supported around the pivot shaft with an outer peripheral surface thereof being in contact with the pressed section, and an elastic member pressing the pivot shaft toward the pinion shaft.

* * * * *